United States Patent [19]

Fujishita

[11] Patent Number: 5,402,970
[45] Date of Patent: Apr. 4, 1995

[54] BAND-TYPE CLAMP FOR WIRE HARNESS
[75] Inventor: Mikio Fujishita, Yokkaichi, Japan
[73] Assignee: Sumitomo Wiring Systems, Ltd., Japan
[21] Appl. No.: 124,726
[22] Filed: Sep. 21, 1993
[30] Foreign Application Priority Data Oct. 13, 1992 [JP] Japan .................. 4-077552

[51] Int. Cl.6 .............................................. F16L 3/08
[52] U.S. Cl. ...................................... 248/74.3; 248/71
[58] Field of Search .................... 248/74.3, 74.2, 73, 248/71; 24/16 PB, 17 AP

[56] References Cited

U.S. PATENT DOCUMENTS

| | | | |
|---|---|---|---|
| 4,261,539 | 4/1981 | Albern et al. | 248/73 |
| 4,708,306 | 11/1987 | Mitomi | 248/74.3 |
| 5,112,013 | 5/1992 | Tolbert et al. | 248/74.3 |
| 5,131,613 | 7/1992 | Kamiya et al. | 248/74.3 |

FOREIGN PATENT DOCUMENTS 136009 9/1984 Japan .

Primary Examiner—Ramon O. Ramirez
Attorney, Agent, or Firm—Jordan B. Bierman

[57] ABSTRACT

This invention aims to increase a clamping force exerted on an electrical cable to thereby prevent it from being shifted by an external force when provided in a band-type clamp for a wire harness. The band-type clamp for the wire harness has a band securing portion 2 formed on a proximal end 9 of a winding band 1 and is provided with a lock member 3 which stands on the portion 2 and is adapted to be engaged with a mounting hole in a car body. The winding band 1 is provided near the proximal end 9 and on the rear side thereof with a cable stopping belt 10 which is raised longitudinally from the rear side, connected to the band 1 at the opposite ends 7 thereof, and is separated at the opposite side edges 8 from the winding band 1 when it is straightened. The cable stopping belt 10 is provided in an opposing in relationship to a lower face 5 of the band securing portion 2 at the intermediate part thereof when an electrical cable 6 is clamped by the winding band 1. The cable 6 passes along the side of the cable stopping belt.

3 Claims, 3 Drawing Sheets

BAND-TYPE CLAMP FOR WIRE HARNESS

BACKGROUND OF THE INVENTION

1. Field of the Invention

This invention relates to a band-type clamp for a wire harness which is used for fastening and securing an electrical cable of a wire harness provided in an automobile, and an electrical device or the like.

2. Statement of the Prior Art

A conventional band type of clamp for a wire harness is known from, for example, Japanese Utility Model Public Disclosure No. 59-136009 (1984). For convenience of explanation, a basic construction of the clamp will be described by referring to FIGS. 7 and 8. FIG. 7 is a front side view of the prior band-type clamp for a wire harness and FIG. 8 is a front side view illustrating the clamp in use.

As shown in FIGS. 7 and 8, the basic construction of the prior clamp comprises winding band 1 adapted to be wound around an electrical cable, a band securing portion 2 formed on a proximal end 9 of the winding band 1 and having a through-hole 4 adapted to receive the band 1, and a lock member 3 standing on the band securing portion 2 and adapted to be engaged with a mounting hole 21 in a wall plate 20 in a car body or a device. The winding band 1 is inserted in the through-hole 4 to form a hoop and is held in the throughhole 4. An electrical cable 6 is passed through the hoop of the band 1 and the cable 6 is clamped between the interior of the band 1 and a lower face of the band securing portion 2 under fastening of the band 1. While being maintained in this position, the lock member 3 is engaged with the mounting hole 21 in the mating member 20.

In the above prior art band-type clamp for use in a wire harness, in the case that one or two electrical cables 6 are wound by the band 1, there exist clearances 16 (see FIG. 8) on the opposite sides of the cable or cables and a clamping force therefore gradually decreases even if the winding band 1 is firmly secured since the cable or cables 6 are secured between the interior of the band 1 and the lower face of the band securing portion 2 under fastening of the band 1. Consequently, when an external Force is applied to the electrical cable or cables 6, the cable or cables are readily shifted in a longitudinal or lateral direction.

Accordingly, when the wire harness is taken out of, for example, a casing after applying the clamp to the wire harness, any existing electrical cable of another wire harness or the like is apt to be caught by the casing, thereby shifting the clamp from its normal position or altering its angle. This makes it difficult or impossible to mount the clamp on an automobile, an electrical device or the like.

SUMMARY OF THE INVENTION

An object of the present invention is to provide a band-type clamp for a wire harness, in which a clamping force of an electrical cable can be enhanced and the cable can be prevented from being shifted by an external force.

In order to achieve the above object, a band-type clamp for a wire harness, in accordance with the present invention, comprises:

a winding band;

a band securing portion formed on a proximal end of said winding band and having a through-hole therein;

a lock member standing on said band securing portion and adapted to be engaged with a mounting hole in a mating member; and a cable stopping belt raised longitudinally from the rear side of said winding band, connected to said band at the opposite ends thereof, and separated at the opposite side edges from said band when said band is straightened. Said cable stopping belt is provided in an opposing relationship to a lower face of said band securing portion when said band is inserted into said through-hole so as to clamp an electrical cable between said bottom face and the rear side of said band.

In the above band-type clamp for the wire harness in accordance with the present invention, since the cable stopping belt is provided near the proximal end of the winding band and on the interior of the band, the straight span between belt ends of the cable stopping belt is shortened and the cable stopping belt projects inwardly in a hoop of the band at the central portion of the belt, when the band is formed into a hoop (the band is inserted into the through-hole of the band securing portion to form a hoop) to clamp the electrical cable.

When a cable or cables are disposed adjacent to the side of the cable stopping belt and the band is fastened, the convex cable stopping belt pushes against the lower face of the band securing portion and the cable stopping belt is wound around the cable. The cable is clamped among the cable stopping belt, the bottom face of the band securing portion, and the interior of the band. Accordingly, the cable stopping belt fully fixes the cable.

DETAILED DESCRIPTION OF THE PREFERRED EMBODIMENT

Figure 1:
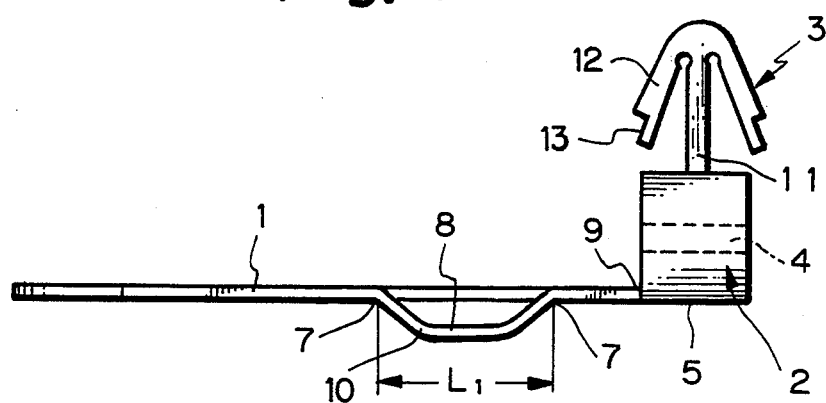
FIG. 1 is a front side view of a band type of clamp for a wire harness in accordance with the present invention.
Figure 3:
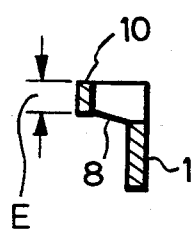
FIG. 3 is a cross sectional view taken along lines III—III in FIG. 2.
Figure 2:
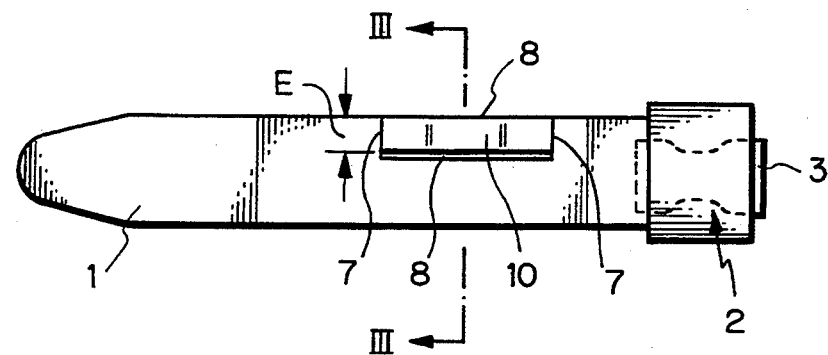
FIG. 2 is a bottom side view of FIG. 1.

An embodiment of a band-type clamp for a wire harness in accordance with the present invention will be described below by referring to FIGS. 1 to 6.

As shown in FIGS. 1 to 4, the band-type clamp for the wire harness in accordance with the present invention has a winding band 1, a band securing portion 2 formed on a proximal end 9 of the band 1 and provided with a throughhole 4 for the band 1, and a lock member 3 standing on the band securing portion 2 and adapted to be engaged with a mounting hole 21 in a car body 20. An electrical cable 6 is held by inserting the band 1 into the through-hole 4 and fastening the band 1, with the lock member 3 being engaged with the mounting hole 4.

The winding band 1 is provided with a cable stopping belt 10 described below.

The cable stopping belt 10 is raised from the interior of the winding band 1 near the proximal end 9. The belt 10 extends longitudinally along one side edge of the band 1 to form a trapezoidal shape with a belt width E. The belt 10 is integrally connected to the band 1 at the opposite belt ends 7 and is separated from the band 1 at the side edges 8.

Figure 4:
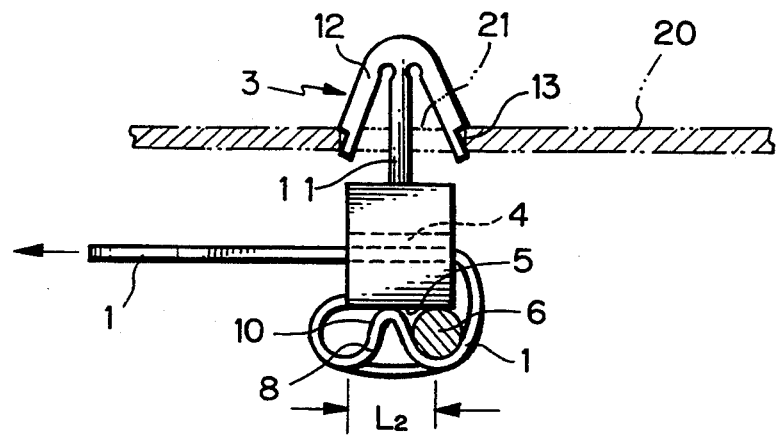
FIG. 4 is a front side view of the clamp under use.

When the cable stopping belt is formed into a hoop to clamp the electrical cable 6 as shown in FIG. 4 (the hoop is formed by inserting the winding band 1 into the throughhole), and intermediate portion of the cable stopping belt 10 on the rounded band 1 is opposed to the bottom face 5 of the band securing portion 2. The lock member 3 in this embodiment has a pole 11 standing on the band securing portion 2 and an elastic V-shaped lever 12 which is connected to a top end of the pole 11 at the valley of the V shape and has lock portions 13 on the opposite free ends.

The cable stopping belt 10 raised from the interior of the winding band 1 in the above embodiment of the bandtype clamp for the wire harness has a span $L_1$ between the belt ends 7 when the winding band 1 is straightened and a span $L_2$ between the belt ends 7 when the band 1 is rounded to clamp the cable 6. Since the span $L_2$ is shorter than the span $L_1$, the cable stopping belt 10 projects inwardly on the rounded band 1. When the band 1 is fastened, the cable stopping belt 10 in the projecting posture pushes the lower face 5 of the band securing portion 2. The electrical cable 6 which passes adjacent to the side of the convex belt 10 is clamped by the belt 10, the band 1, and the lower face 5, thereby physically increasing a clamping force of the band 1.

Figure 5:
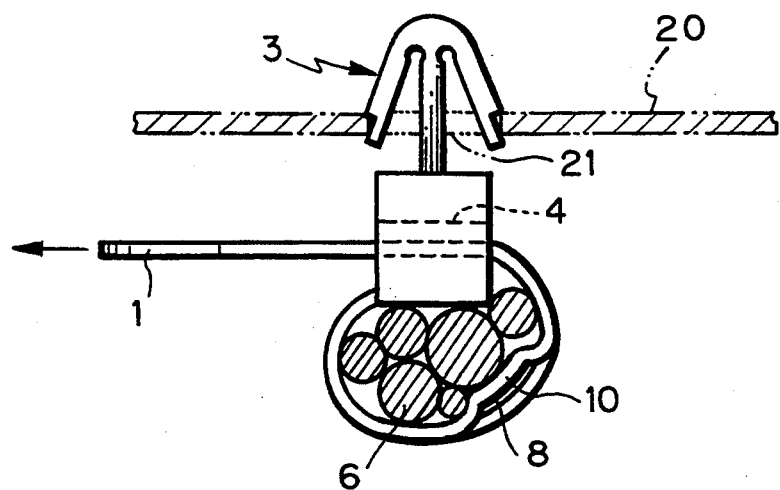
FIG. 5 is a front side view of the clamp under another use.

Accordingly, it is possible to assure a sufficient clamping force for a single electrical cable 6. If more than three electrical cables 6 are clamped as shown in FIG. 5, no problem arises since the cable stopping belt is elastically depressed by the cable or cables 6, and pushing the cables 6 by its buckling force.

Figure 6A:
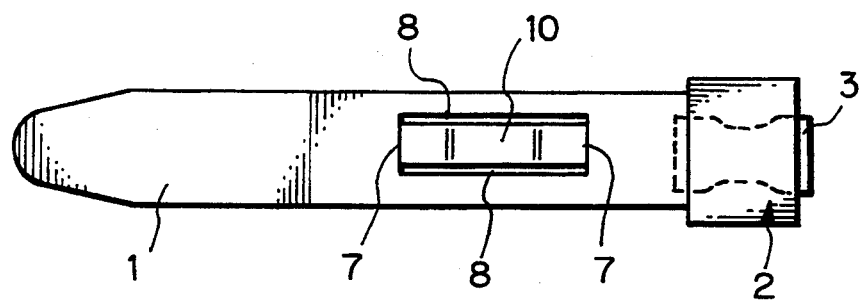
FIGS. 6A and 6B are bottom side views of an alternation of the clamp of the present invention.
Figure 6B:
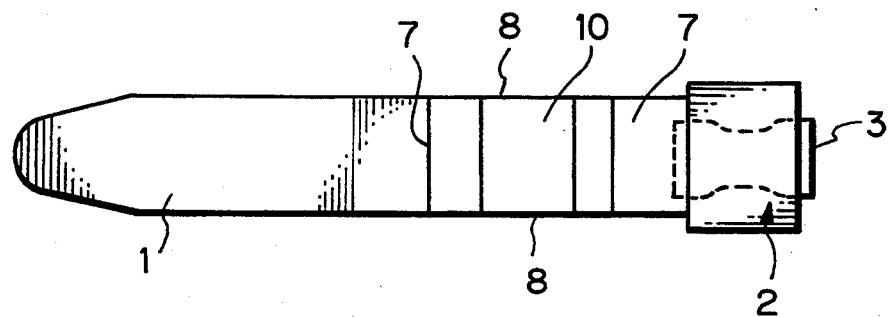
Figure 7:
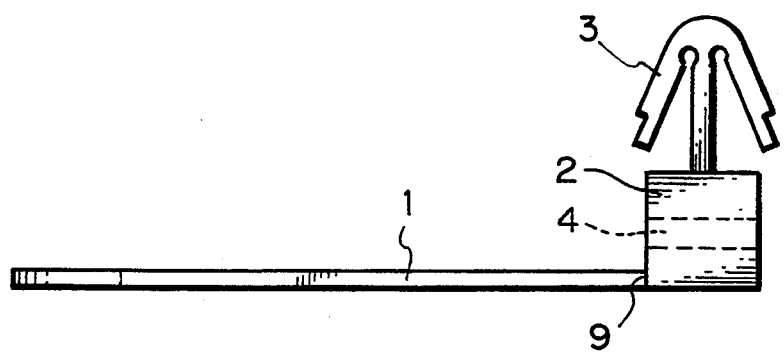
FIG. 7 is a front side view of a prior band type of clamp for a wire harness.
Figure 8:
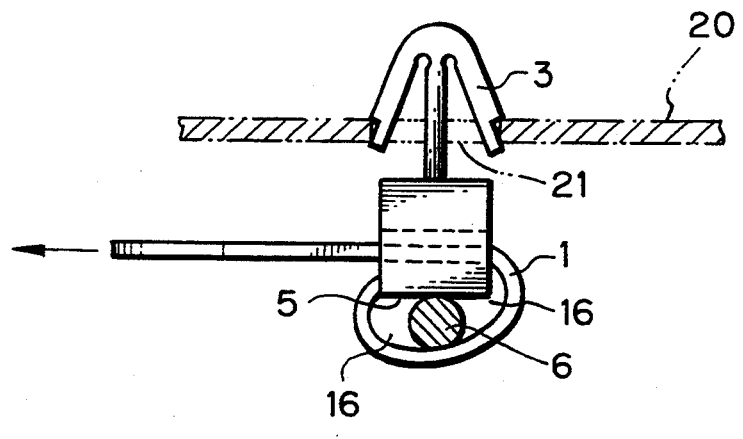
FIG. 8 is a front side view of the clamp of FIG. 7, illustrating a state during use.

It should be noted that the band-type clamp for the wire harness in accordance with the present invention is not limited to the above embodiment. For example, the cable stopping belt 10 may be provided on an intermediate portion of the band 1 in a widthwise direction (FIG. 6A) or across the entire width of the band 1 (FIG. 6B).

It will be apparent from the foregoing that the band-type clamp for the wire harness in accordance with the present invention enhances a clamping force even in the case of one or two electrical cables being employed, to thereby prevent the cable or cables from being shifted by an external force, and to provide a stable and secure means of attaching the wire harness to an automobile, an electrical device or the like.

What is claimed is:

1. A clamp for a wire harness comprising a winding band having edges, a front side and a rear side between said edges, a band securing portion on a proximal end of said front side and having a through-hole therein;

a lock member on said band securing portion adapted to be secured to a mating member through a mounting hole;

a cable stopping belt attached to said winding band at opposite ends of said belt, a first length of said belt between said opposite ends being greater than a second length of said band between said opposite ends, whereby said belt projects from said rear side when said band is flat and, when said band is in said through-hole, a cable is clamped between said rear side and a bottom face of said band securing portion, said belt being on one side of said band in a widthwise direction.

2. A band-type clamp for a wire harness according to claim 1, wherein said cable stopping belt is provided at an intermediate portion of said band in a widthwise direction.

3. A band type clamp for a wire harness according to claim 1, wherein said cable stopping belt is provided across the entire width of said band.

* * * * *